United States Patent
Toyoda et al.

[11] Patent Number: 5,871,852
[45] Date of Patent: Feb. 16, 1999

[54] SLIDE SURFACE CONSTRUCTION

[75] Inventors: Yusuke Toyoda; Masamune Tabata; Kenji Dosaka, all of Saitama, Japan

[73] Assignee: Honda Giken Kogyo Kabushiki Kaisha, Tokyo, Japan

[21] Appl. No.: 614,378

[22] Filed: Mar. 12, 1996

[30] Foreign Application Priority Data

Mar. 15, 1995 [JP] Japan .................................. 7-083335
Mar. 31, 1995 [JP] Japan .................................. 7-099755

[51] Int. Cl.$^6$ .............................. C25D 3/20; B32B 15/18; C22C 38/18; C22C 38/40
[52] U.S. Cl. ......................... 428/681; 428/687; 428/935; 148/320; 148/325; 148/327; 148/335
[58] Field of Search ..................... 428/544, 687, 428/653, 935, 680, 681, 685; 148/320, 324, 325, 327, 335; 205/255

[56] References Cited

U.S. PATENT DOCUMENTS

| | | | |
|---|---|---|---|
| 5,310,606 | 5/1994 | Fujisawa et al. | 428/645 |
| 5,320,912 | 6/1994 | Fujisawa et al. | 428/687 |
| 5,322,742 | 6/1994 | Fujisawa et al. | 428/687 |
| 5,322,743 | 6/1994 | Fujisawa et al. | 428/687 |
| 5,324,596 | 6/1994 | Fujisawa et al. | 428/687 |
| 5,340,660 | 8/1994 | Fujisawa et al. | 428/687 |
| 5,342,698 | 8/1994 | Fujisawa et al. | 428/612 |
| 5,376,194 | 12/1994 | Gunji et al. | 148/426 |
| 5,401,585 | 3/1995 | Fujisawa et al. | 428/653 |
| 5,427,633 | 6/1995 | Fujisawa et al. | 148/320 |
| 5,443,919 | 8/1995 | Fujisawa et al. | 428/627 |
| 5,443,920 | 8/1995 | Fujisawa et al. | 428/687 |
| 5,445,684 | 8/1995 | Gunji et al. | 148/320 |
| 5,468,567 | 11/1995 | Fujisawa et al. | 428/645 |
| 5,503,942 | 4/1996 | Tabata et al. | 428/687 |
| 5,597,657 | 1/1997 | Gunji et al. | 428/680 |

FOREIGN PATENT DOCUMENTS 6174089  6/1994  Japan .

*Primary Examiner*—John J. Zimmerman
*Assistant Examiner*—Michael LaVilla
*Attorney, Agent, or Firm*—Lyon & Lyon LLP

[57] ABSTRACT

A slide surface construction is formed of an aggregate of Fe crystals on a surface of a slide member such as a piston, cylinder, piston ring of the like. The area rate A of hexagonal pyramid-shaped Fe crystals in the slide surface is in the range of $40\% \leq A \leq 100\%$, and the content of Ni in the aggregate is in a range of $1\%$ by weight$\leq Ni \leq 40\%$ by weight. The slide surface takes on an intricate aspect due to the presence of a large number of hexagonal pyramid-shaped Fe crystals and hence, has a good oil retention. The slide surface construction exhibits an excellent corrosion resistance, because it contains nickel (Ni) or chromium (Cr) or both. Thus, the corrosion of the pyramid-shaped Fe crystals is inhibited in a corrosive sliding environment and hence, the oil retention is maintained.

20 Claims, 13 Drawing Sheets

Example 4

Example 4

Example 1

Example 1

SLIDE SURFACE CONSTRUCTION

BACKGROUND OF THE INVENTION

1. Field of the Invention

The present invention relates to a slide surface construction, and particularly, to a slide surface construction comprised of an aggregate of Fe crystals and having a corrosion resistance.

2. Description of the Related Art

In order to improve the frictional resistance, such conventionally known slide surface constructions include an Fe-plated layer, for example, which is provided on outer peripheral surfaces of a land portion and a skirt portion of a piston body made of an aluminum alloy in a piston for an internal combustion engine.

However, the known slide surface construction suffers from a problem that under existing circumstances where speed and output of the internal combustion engine have tended to increase, the known slide surface construction is not sufficient in oil retaining property, namely, oil retention and seizure resistance are poor due to a relatively smooth slide surface thereof.

Therefore, the assignee of the present invention has developed a slide surface construction having a large number of pyramid-shaped Fe crystals in a slide surface thereof (for example, see Japanese Patent Application Laid-open No. 174089/94).

If the slide surface construction is formed in this manner, adjacent pyramid-shaped Fe crystals assume mutually biting states and hence, the slide surface takes on an intricate aspect comprising a large number of fine crests, a large number of fine valleys formed between the crests, and a large number of fine swamps formed due to mutual biting of the crests. Therefore, the slide surface construction has a good oil retention. Thus, the seizure resistance of the slide surface construction is enhanced.

However, as a result of various reviews of that slide surface construction, it has been made clear that the slide surface construction has a relatively low corrosion resistance, and hence, in order to permit the slide surface construction of the piston to maintain a good oil retention, for example, in a sliding environment in which salt as a road anti-freezing agent is drawn into the engine along with air, it is necessary for the slide surface construction to have an excellent corrosion resistance.

There is also a conventionally known cylinder sleeve formed of a cast iron, for example, in a diesel engine or a methanol engine for a vehicle. In the diesel engine, sulfuric acid is produced during burning of fuel, and in the methanol engine, formic acid is produced during burning of fuel. For this reason, it is required that the cylinder sleeve has a high corrosion resistance and thus a high acid resistance. However, in the present situation, a means for meeting such a requirement has not been developed.

SUMMARY OF THE INVENTION

It is an object of the present invention to provide a slide surface construction of the above described type, which is formed on a surface of a slide member, such as a cylinder or piston, to exhibit an excellent corrosion resistance.

To achieve the above object, according to the present invention, there is provided a slide surface construction which is formed of an aggregate of Fe crystals, wherein the area rate A of pyramid-shaped Fe crystals in the slide surface is in the range of $40\% \leq A \leq 100\%$, and the content of Ni in the aggregate is in the range of $1\%$ by weight $\leq Ni \leq 40\%$ by weight.

If the area rate A of pyramid-shaped Fe crystals in the slide surface is set in such range, the adjacent pyramid-shaped Fe crystals assumes a mutually biting state and hence, the slide surface takes on an intricate aspect comprising a large number of fine crests, a large number of fine valleys formed between the crests, and a large number of fine swamps formed due to mutual biting of the crests.

If the content of Ni in the aggregate is set in the above-described range, the slide surface is passivated by formation of a solid skin on the surface of each of the pyramid-shaped Fe crystals in a corrosive sliding environment and hence, the slide surface construction exhibits an excellent corrosion resistance.

In such slide surface construction, the corrosion of the pyramid-shaped Fe crystals is inhibited, even if such slide surface construction is placed in the corrosive sliding environment. Therefore, under lubrication the oil retention of the slide surface construction is maintained satisfactorily and under non-lubrication the dispersion of a sliding load is provided by the large number of fine pyramid-shaped Fe crystals. Thus, the slide surface construction exhibits an excellent seizure resistance under both lubrication and non-lubrication.

If the area rate A of the pyramid-shaped Fe crystals is lower than 40%, the slide surface tends to be simplified and hence, such area rate A lower than 40% is undesirable. If the Ni content is lower than 1% by weight, the degree of enhancement in corrosion resistance of the slide surface construction is reduced. On the other hand, if the Ni content is higher than 40% by weight, a Ni-based intermetallic compound is produced in an increased amount and for this reason, the Fe crystals are liable to be granulated in the slide surface, and the strength of the slide surface construction is reduced due to a grain boundary segregation of such intermetallic compound. The Ni-based intermetallic compound is started to be produced at a Ni content nearly equal to 6% by weight.

It is another object of the present invention to provide a slide surface construction of the above described type, which is formed on a slide member, such as an inner peripheral surface of a cylinder sleeve made of a cast iron, and which can contribute to an enhancement in acid resistance of the cylinder sleeve and exhibit an excellent slide characteristic.

To achieve the above object, according to the present invention, there is provided a slide surface construction, which is formed of an aggregate of Fe crystals, wherein the area rate A of pyramid-shaped Fe crystals in a slide surface is in a range of $40\% \leq A \leq 100\%$, and the content of Cr in the aggregate is in a range of $2\%$ by weight $\leq Cr \leq 48\%$ by weight.

If the area rate A of pyramid-shaped Fe crystals in the slide surface is set in such range, the adjacent pyramid-shaped Fe crystals assumes a mutually biting state and hence, the slide surface takes on an intricate aspect comprising a large number of fine crests, a large number of fine valleys formed between the crests, and a large number of fine swamps formed due to mutual biting of the crests.

If the content of Cr in the aggregate of the Fe crystals is set in the above-described range, Cr forms a substitutional solid solution together with Fe. In a corrosive sliding environment containing an acid, the slide surface is passivated by formation of a solid skin on a surface of each of the pyramid-shaped Fe crystals and hence, the slide surface construction exhibits an excellent acid resistance.

In such slide surface construction, the corrosion (oxidation) of the pyramid-shaped crystals is inhibited even if the slide surface construction is placed in a corrosive sliding environment containing an acid. Therefore, under lubrication the oil retention of the slide surface construction is maintained satisfactorily and under non-lubrication the dispersion of a sliding load is provided by the large number of pyramid-shaped Fe crystals. Thus, the slide surface construction exhibits an excellent seizure resistance under both lubrication and non-lubrication.

If the area rate A of the pyramid-shaped Fe crystals is lower than 40%, the slide surface tends to be simplified and hence, such area rate A lower than 40% is undesirable. If the Cr content is lower than 2% by weight, the degree of enhancement in acid resistance of the slide surface construction is reduced. On the other hand, if the Cr content is higher than 48% by weight, an Cr—Fe based intermetallic compound is produced in an increased amount and for this reason, the Fe crystals are liable to be granulated in the slide surface and the strength of the slide surface construction is reduced due to a grain boundary segregation of such intermetallic compound.

The above and other objects, features and advantages of the invention will become apparent from the following description of preferred embodiments taken in conjunction with the accompanying drawings.

DETAILED DESCRIPTION OF THE PREFERRED EMBODIMENTS (First Embodiment)

Figure 1:
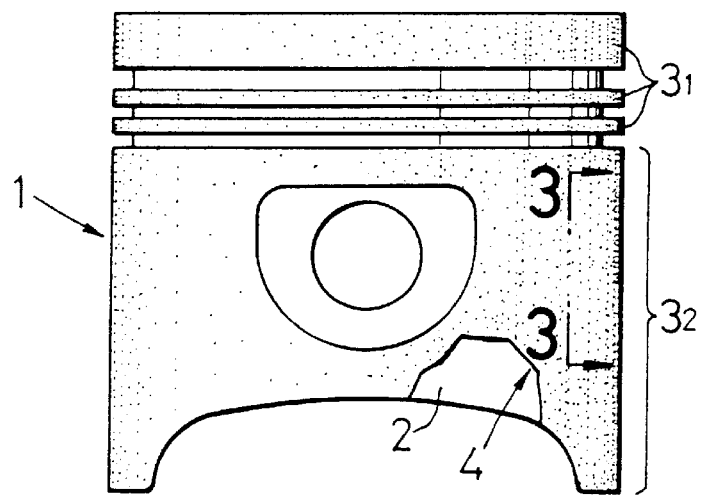
FIG. 1 is a partially broken-away front view of an essential portion of a piston.

Referring to FIG. 1, a piston 1 for an internal combustion engine includes a piston body 2 made of an aluminum alloy. A lamellar slide surface construction 4 is formed by plating on outer peripheral surfaces of a land portion $3_1$ and a skirt portion $3_2$ of the piston body 2.

Figure 2:
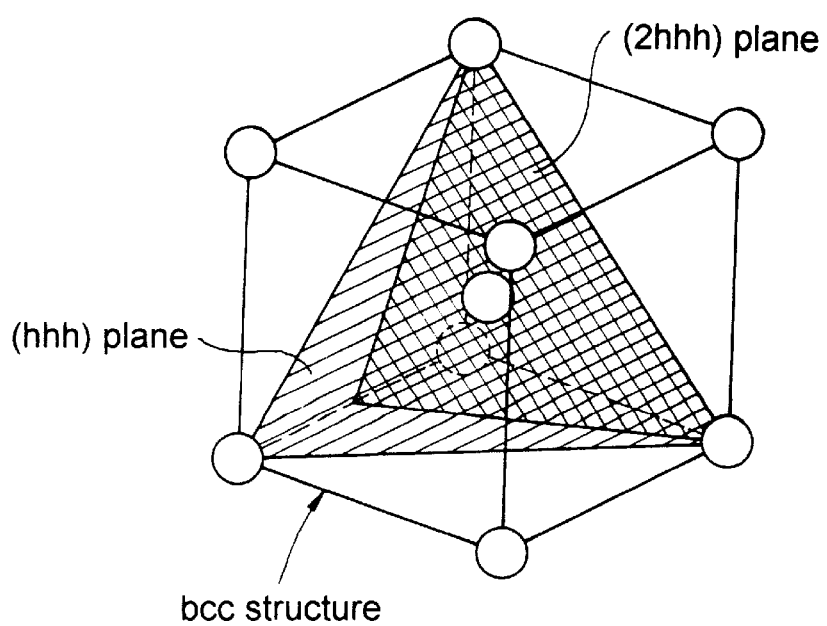
FIG. 2 is a perspective view of a body-centered cubic structure and its (hhh) plane and (2hhh) plane.
Figure 3:
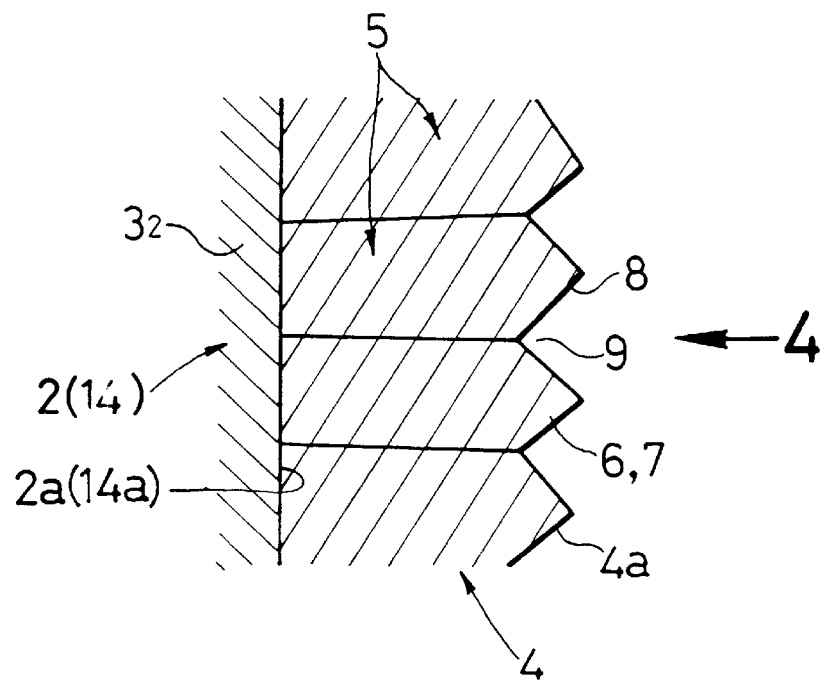
FIG. 3 is an enlarged sectional view taken along a line 3—3 in FIG. 1.

The slide surface construction 4 is formed of an aggregate of iron (Fe) crystals having a body-centered cubic structure (which will be referred to as a bcc structure), as shown in FIG. 2. The aggregate contains nickel (Ni) which is an added element. The content of Ni in the aggregate preferably is set in a range of 1% by weight$\leq$Ni$\leq$40% by weight. As shown in FIG. 3, the aggregate includes at least one of either a large number of (hhh) oriented Fe crystals 5 which are grown from an outer peripheral surface 2a of the piston body 2 into a columnar shape with their (hhh) planes (by Miller indices) oriented toward a slide surface 4a, and a large number of (2hhh) oriented Fe crystals 5 which are grown from the outer peripheral surface 2a of the piston body 2 into a columnar shape with their (2hhh) planes (by Miller indices) oriented toward the slide surface 4a.

Figure 4:
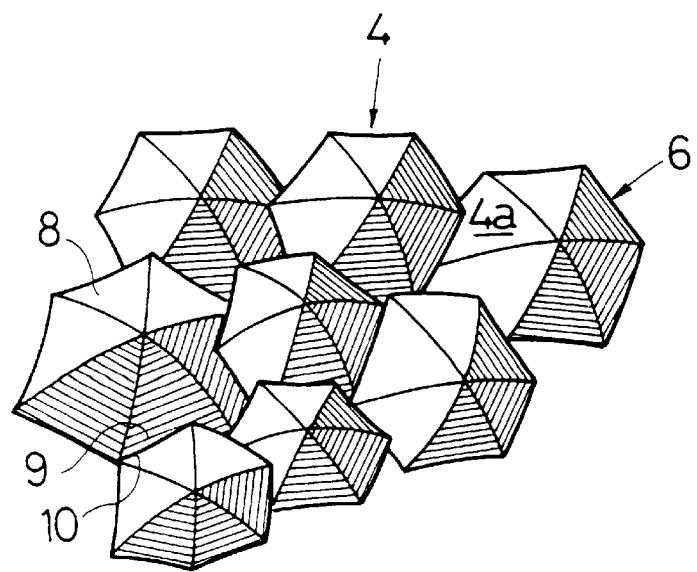
FIG. 4 is a view taken along an arrow 4 in FIG. 3.
Figure 5:
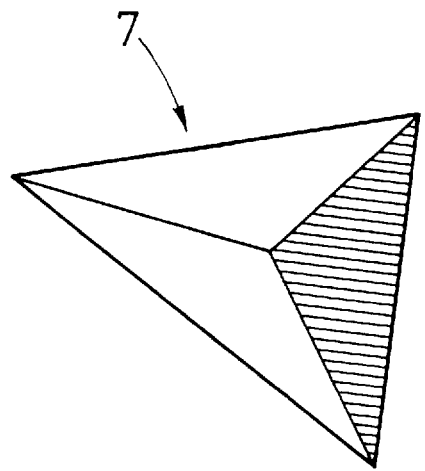
FIG. 5 is a plan view of a trigonal pyramid-shaped Fe crystal.

When the aggregate of the Fe crystals 5 includes the large number of (hhh) oriented Fe crystals with their (hhh) planes (by Miller indices) oriented toward the slide surface 4a, as described above, the tip ends of the (hhh) oriented Fe crystals 5 can be formed into hexagonal pyramid-shaped Fe crystals 6 as shown in FIG. 4, or a trigonal pyramid-shaped Fe crystals 7 as shown in FIG. 5 in the slide surface 4a. The hexagonal pyramid-shaped Fe crystals 6 are small in average grain size and substantially uniform in grain sizes, as compared with the trigonal pyramid-shaped Fe crystals 7. In the hexagonal pyramid-shaped Fe crystals 6 or the like, there is an interrelation between the grain size and the height and hence, the grain sizes are uniform, which indicates the heights are substantially equal to one another.

When the aggregate of the Fe crystals 5 includes the large number of (2hhh) oriented Fe crystals with their (2hhh) planes (by Miller indices) oriented toward the slide surface 4a, the tip ends of the (2hhh) oriented Fe crystals can be formed into small pyramid-shaped Fe crystals.

The area rate A of the pyramid-shaped Fe crystals such as the hexagonal and trigonal pyramid-shaped Fe crystals 6 and 7 and the small pyramid-shaped Fe crystals preferably is set in a range of $40\% \leq A \leq 100\%$.

If the area rate A is set in such a range, for example, the hexagonal pyramid-shaped Fe crystals 6 are formed into states with adjacent crystals biting into each other, as shown in FIG. 4. Thus, the surface area of the slide surface 4a is increased, as compared with a case where the slide surface 4a is formed of the trigonal pyramid-shaped Fe crystals 7, and the slide surface 4a takes on a very intricate aspect comprising a large number of extremely fine crests 8, a large number of extremely fine valleys 9 formed between the crests 8, and a large number of extremely fine swamps 10 formed due to mutual biting of the crests 8.

If the content of nickel (Ni) in the aggregate is set in the above-described range, the slide surface 4a is passivated by the formation of a stationary skin on the surface of each hexagonal pyramid-shaped Fe crystal 6 in a corrosive sliding environment and hence, the slide surface construction 4 exhibits an excellent corrosion resistance.

In such a slide surface construction 4, even if it is placed in the corrosive sliding environment, the corrosion of each hexagonal pyramid-shaped Fe crystal 6 is inhibited. Therefore, under lubrication, the oil retention of the slide surface construction 4 is maintained satisfactorily and, under non-lubrication, the dispersion of a sliding load is provided by the large number of extremely fine hexagonal pyramid-shaped Fe crystals. Thus, the slide surface construction 4 exhibits an excellent seizure resistance under both lubrication and non-lubrication.

Further, as a result of uniform fine division of the hexagonal pyramid-shaped Fe crystals 6, a local increase in surface pressure can be avoided, and a fine division of the sliding load can be achieved. Thus, the slide surface construction 4 exhibits an excellent wear resistance not only under lubrication but also under non-lubrication.

Figure 6:
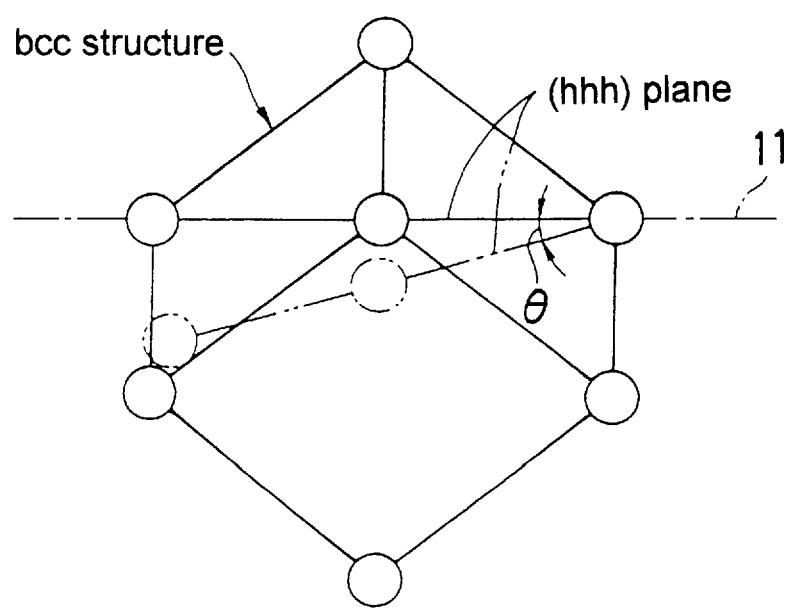
FIG. 6 is an illustration showing the inclination of the (hhh) plane in the body-centered cubic structure.

As shown in FIG. 6, an inclination of the (hhh) plane with respect to a phantom plane 11 along the slide surface 4a appears as an inclination of the hexagonal and trigonal pyramid-shaped Fe crystals 6 and 7 and hence, an influence is imparted to the oil retention and wear resistance of the slide surface construction 4. Thereupon, the inclination angle θ formed by the (hhh) plane with respect to the phantom plane 11 preferably is set in a range of $0° \leq \theta \leq 15°$. In this case, the direction of inclination of the (hhh) plane is not limited. If the inclination angle is larger than 15°, the oil retention and the wear resistance of the slide surface construction 4 are reduced. The inclination angle θ also applies to the (2hhh) plane.

In a plating treatment for forming the slide surface construction 4, conditions for a plating bath in carrying out an electrolytic Fe plating process are as given in Table 1.

TABLE 1

| Composition (g/liter) | | | | | |
|---|---|---|---|---|---|
| Ferrous sulfate | Boric acid | Ammonium sulfate | Ni-containing additive | pH | Temperature (°C.) |
| 100–400 | 0–50 | 0–200 | ≦230 | 3–6.5 | 10–60 |

The Ni-containing additive used may be any of the substances which contain nickel (Ni) and which are soluble in water, such as nickel sulfate, nickel chloride, nickel sulfaminate, nickel sulfosalicylate, nickel acetate and the like.

Figure 7:
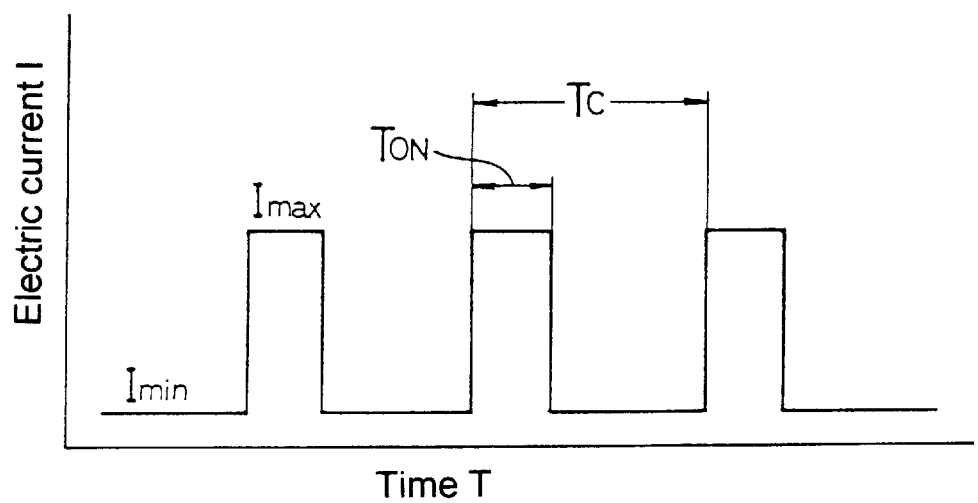
FIG. 7 is a diagram showing an output waveform from a power source for an electrolytic plating.

A pulse current process is mainly utilized as an energizing process. In the pulse current process, electric current I from a plating power source is controlled to describe a pulse waveform with the passage of time T, so that the current I is increased from a minimum current value Imin and reaches a maximum current value Imax, and is then reduced to the minimum current value Imin, as shown in FIG. 7.

If the energization time period from the start of the increasing of the electric current I to the start of the reducing of the electric current I is represented by $T_{ON}$; a cycle time period is represented by $T_C$, wherein one cycle is defined as being from the start of one current increasing to the start of the next current increasing, the ratio of the energization time period $T_{ON}$ to the cycle time period $T_C$, i.e., the time ratio $T_{ON}/T_C$ is set in a range of $T_{ON}/T_C \leq 0.45$. The maximum cathode current density CDmax is set in a range of CDmax $\leq 2$ A/dm$^2$, and the average cathode current density CDm is set in a range of CDm $\leq 1$ A/dm$^2$.

If such a pulse current process is utilized, the ion concentration in the vicinity of a cathode is uniformized due to the fact that the maximum electric current alternately flows and does not flow in the plating bath. Thus, the composition of the slide surface construction 4 can be stabilized.

In the above-described electrolytic Fe plating process, the precipitation and content of the (hhh) oriented Fe crystals or the (2hhh) oriented Fe crystals are controlled by changing the plating bath conditions and the energizing conditions. This control is easy under the utilization of the pulse current process and hence, the slide surface 4a is easily formed into an intended form. In addition, the content of the Ni in the slide surface construction 4 is accurately controlled, and the Ni is uniformly dispersed and hence, during the electrolytic Fe plating, a liquid replenisher adjusted to the same composition and the same temperature as those of the plating bath is supplied in a predetermined amount between the anode and the cathode. If this supplying is not carried out, a variability in concentration of the Ni-containing additive in the plating bath is produced and for this reason, it is difficult to control the content of Ni in the slide surface construction 4.

Usually, the content of Ni in the slide surface construction 4 is controlled by the concentration of the Ni-containing additive in the plating bath.

In addition to the electrolytic Fe plating, other examples of a plating process are a PVD process, a CVD process, a sputtering process, an ion plating and the like, which are gas-phase plating processes.

Particular examples will be described below.

A plurality of pistons 1 for internal combustion engines were produced by subjecting outer peripheral surfaces 2a of a land portion $3_1$ and a skirt portion $3_2$ of a piston body 2 made of an aluminum alloy to an electrolytic Fe plating process to form a slide surface construction 4 comprised of an aggregate of Fe crystals and having a thickness of 15 μm.

For the examples of the slide surface constructions, Table 2 shows the composition of the plating bath for the examples 1 to 16, and Table 3 shows the pH value and the temperature of the plating bath and the conditions for carrying the pulse current process for the examples 1 to 16. The plating time was varied within a range of 5 to 60 minutes in order to set the thickness for the examples 1 to 16 at 15 μm as described above. In addition, the amount of liquid replenisher supplied was set at 0.5 liters/min.

TABLE 2

| Slide surface construction | Composition of plating bath | |
|---|---|---|
| | Ferrous sulfate (g/liter) | Nickel sulfate (g/liter) |
| Example 1 | 400 | 0 |
| Example 2 | 400 | 50 |
| Example 3 | 400 | 100 |
| Example 4 | 400 | 200 |
| Example 5 | 300 | 0 |
| Example 6 | 300 | 40 |
| Example 7 | 300 | 80 |
| Example 8 | 300 | 160 |
| Example 9 | 200 | 0 |
| Example 10 | 200 | 25 |
| Example 11 | 200 | 50 |
| Example 12 | 200 | 100 |
| Example 13 | 100 | 0 |
| Example 14 | 100 | 15 |
| Example 15 | 100 | 30 |
| Example 16 | 100 | 60 |

TABLE 3

| Slide surface construction | Plating Bath | | Pulse current process | | | |
|---|---|---|---|---|---|---|
| | pH | Temperature (°C.) | CDmax (A/dm$^2$) | CDm (A/dm$^2$) | $T_{ON}/T_C$ | $T_{ON}$ (msec) |
| Examples 1 to 16 | 6 | 50 | 20 | 4 | 0.2 | 2 |

Tables 4, 5, 6 and 7 show the crystal form of the slide surface, the area rate A and grain size (i.e., grain diameter) of the trigonal and/or hexagonal pyramid-shaped Fe crystals in the slide surface, the content S of the oriented Fe crystals, the Ni content and the hardness of the slide surface construction section, wherein Table 4 corresponds to those for the examples 1 to 4; Table 5 corresponds to those for the examples 5 to 8; Table 6 corresponds to those for the examples 9 to 12; and Table 7 corresponds to those for the examples 13 to 16.

TABLE 4

| Slide surface construction | Crystalline form of slide surface | Hexagonal pyramid-shaped Fe crystals | | Content S (%) of oriented Fe crystals | | | | | Ni content (% by weight) | Hardness (HmV) |
|---|---|---|---|---|---|---|---|---|---|---|
| | | Area rate A (%) | Grain size μm | {110} | {200} | {211} | {310} | {222} | | |
| Example 1 | Hexagonal pyramid-shaped and granular | 90 | 1 to 3 | 0.9 | 0.2 | 3.3 | 2.2 | 93.4 | 0 | 210 |
| Example 2 | Hexagonal pyramid-shaped and granular | 90 | 1 to 3 | 0.5 | 0.7 | 4.5 | 1.7 | 91.6 | 0.8 | 240 |
| Example 3 | Hexagonal pyramid-shaped and granular | 90 | 1 to 3 | 0.8 | 1.1 | 4.5 | 1.9 | 91.7 | 1 | 280 |
| Example 4 | Hexagonal pyramid-shaped and granular | 90 | 1 to 3 | 0.7 | 1 | 4.3 | 2.4 | 91.6 | 8 | 300 |

TABLE 5

| Slide surface construction | Crystalline form of slide surface | Trigonal, hexagonal pyramid-shaped Fe crystals | | Content S (%) of oriented Fe crystals | | | | | Ni content (% by weight) | Hardness (HmV) |
|---|---|---|---|---|---|---|---|---|---|---|
| | | Area rate A (%) | Grain size μm | {110} | {200} | {211} | {310} | {222} | | |
| Example 5 | Hexagonal and trigonal pyramid-shaped and granular | 60 | 1 to 5 | 10.7 | 8.5 | 11.9 | 8.5 | 60.4 | 0 | 200 |
| Example 6 | Hexagonal and trigonal pyramid-shaped and | 60 | 1 to 5 | 9.8 | 6.7 | 11.8 | 8.9 | 62.8 | 0.8 | 220 |

TABLE 5-continued

| Slide surface construction | Crystalline form of slide surface | Trigonal, hexagonal pyramid-shaped Fe crystals Area rate A (%) | Grain size μm | Content S (%) of oriented Fe crystals {110} | {200} | {211} | {310} | {222} | Ni content (% by weight) | Hardness (HmV) |
|---|---|---|---|---|---|---|---|---|---|---|
| Example 7 | granular Hexagonal and trigonal pyramid-shaped and granular | 60 | 1 to 5 | 9.8 | 7.3 | 11.8 | 8.4 | 62.7 | 1 | 260 |
| Example 8 | Hexagonal and trigonal pyramid-shaped and granular | 60 | 1 to 5 | 10.1 | 7.6 | 10.7 | 9.7 | 61.9 | 8 | 270 |

TABLE 6

| Slide surface construction | Crystalline form of slide surface | Trigonal pyramid-shaped Fe crystals Area rate A (%) | Grain size μm | Content S (%) of oriented Fe crystals {110} | {200} | {211} | {310} | {222} | Ni content (% by weight) | Hardness (HmV) |
|---|---|---|---|---|---|---|---|---|---|---|
| Example 9 | Trigonal pyramid-shaped and granular | 40 | 0.5 to 5 | 16.7 | 14 | 16.9 | 10.3 | 42.3 | 0 | 190 |
| Example 10 | Trigonal pyramid-shaped and granular | 40 | 0.5 to 5 | 17.1 | 11.1 | 16.1 | 13.8 | 41.9 | 0.8 | 210 |
| Example 11 | Trigonal pyramid-shaped and granular | 40 | 0.5 to 5 | 16.8 | 15.6 | 13 | 12.3 | 42.3 | 1 | 240 |
| Example 12 | Trigonal pyramid-shaped and granular | 40 | 0.5 to 5 | 17.5 | 13.4 | 14.6 | 13.3 | 41.2 | 8 | 250 |

TABLE 7

| Slide surface construction | Crystalline form of slide surface | Trigonal pyramid-shaped Fe crystals Area rate A (%) | Grain size μm | Content S (%) of oriented Fe crystals {110} | {200} | {211} | {310} | {222} | Ni content (% by weight) | Hardness (HmV) |
|---|---|---|---|---|---|---|---|---|---|---|
| Example 13 | Trigonal pyramid-shaped and granular | 35 | 0.5 to 6 | 19.5 | 10.7 | 21.5 | 13.7 | 34.6 | 0 | 180 |
| Example 14 | Trigonal pyramid-shaped and granular | 35 | 0.5 to 6 | 17.4 | 11.2 | 22.3 | 13.1 | 36 | 0.8 | 190 |
| Example 15 | Trigonal pyramid-shaped and granular | 35 | 0.5 to 6 | 20.1 | 9.9 | 20.8 | 14.1 | 35.1 | 1 | 200 |
| Example 16 | Trigonal pyramid-shaped and granular | 35 | 0.5 to 6 | 19.3 | 8.8 | 22 | 11.S | 38.4 | 8 | 220 |

The area rate A of the trigonal and/or hexagonal pyramid-shaped Fe crystals was determined according to an equation, A=(c/b)×100 (%), wherein b represents an area of the slide surface, and c represents an area occupied in the slide surface by all the trigonal and/or hexagonal pyramid-shaped Fe crystals. The grain size of the hexagonal pyramid-shaped Fe crystals is an average value of distances between opposed corners on opposite sides of an apex, i.e., of lengths of three diagonal lines. The grain size of the trigonal pyramid-shaped Fe crystals is an average value of distances from each corner via an apex to each opposed side, i.e., three distances.

Figure 8:
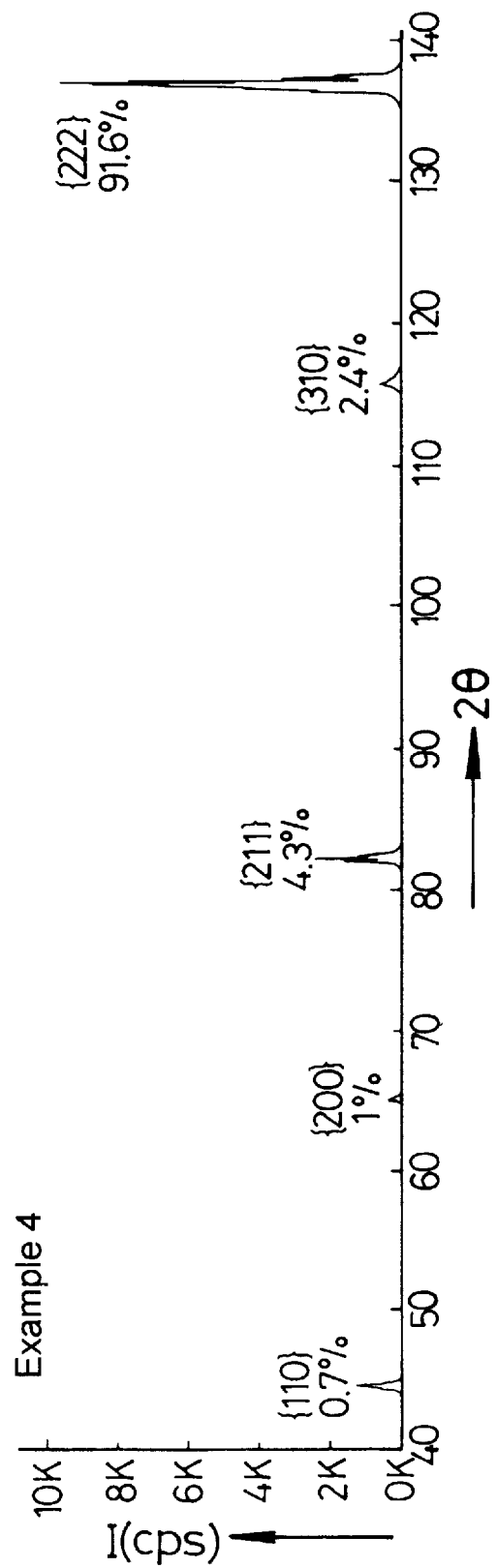
FIG. 8 is an X-ray diffraction pattern for the slide surface construction.

The content S was determined by the following method based on X-ray diffraction patterns (wherein the X-ray beam was applied in a direction perpendicular to the slide surface) for the examples 1 to 16. By way of example, the example 4 will be described below. FIG. 8 is an X-ray diffraction pattern for the example 4. The content S of the oriented Fe crystals was determined from the following equations. For example, the term "{110} oriented Fe crystal" means an oriented Fe crystal with its {110} plane oriented toward the slide surface.

{110} oriented Fe crystals: $S_{110}=\{(I_{110}/IA_{110})/T\}\times 100$

{200} oriented Fe crystals: $S_{200}=\{(I_{200}/IA_{200})/T\}\times 100$

{211} oriented Fe crystals: $S_{211}=\{(I_{211}/IA_{211})/T\}\times 100$

{310} oriented Fe crystals: $S_{310}=\{(I_{310}/IA_{310})/T\}\times 100$

{222} oriented Fe crystals: $S_{222}=\{(I_{222}/IA_{222})/T\}\times 100$ wherein each of $I_{110}$, $I_{200}$, $I_{211}$, $I_{310}$ and $I_{222}$ is a measurement (cps) of an intensity of X-ray reflected from each crystal plane; each of $IA_{110}$, $IA_{200}$, $IA_{211}$, $IA_{310}$ and $IA_{222}$ is an intensity ratio of X-ray reflected from crystal planes in an ASTM card, and $IA_{110}=100$, $IA_{200}=20$, $IA_{211}=30$, $IA_{310}=12$, and $IA_{222}=6$. Further, $T=(I_{110}/IA_{110})+((I_{200}/IA_{200})+(I_{211}/IA_{211})+(I_{310}/IA_{310})+(I_{222}/IA_{222}))$.

Figure 9A:
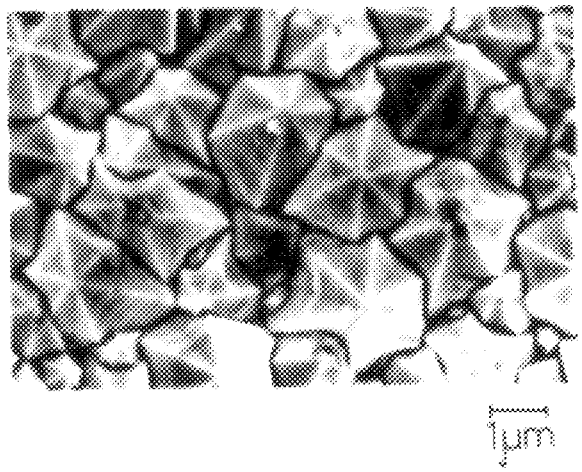
FIG. 9A is a photomicrograph showing the crystal structure of a first example of a slide surface before a corrosion test.

FIG. 9A is a photomicrograph showing the crystal structure of the slide surface in the example 4. In FIG. 9A, a large number of hexagonal pyramid-shaped Fe crystals are observed. In this case, the area rate A of the hexagonal pyramid-shaped Fe crystals is equal to 90%, as given in Table 4. The hexagonal pyramid-shaped Fe crystals are {222} oriented Fe crystals with their (hhh) planes, i.e., {222} planes oriented toward the slide surface. The content S of the {222} oriented Fe crystals is equal to 91.6%, as shown in Table 4 and FIG. 8.

Figure 10A:
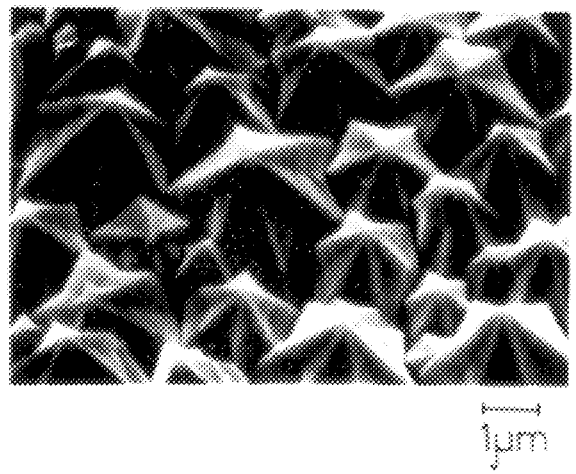
FIG. 10A is a photomicrograph showing the crystal structure of a second example of a slide surface before the corrosion test.

FIG. 10A is a photomicrograph showing the crystal structure of the slide surface in the example 1. In this case, the area rate A of the hexagonal pyramid-shaped Fe crystals is equal to 90%, as shown in Table 4. The hexagonal pyramid-shaped Fe crystals are {222} oriented Fe crystals, as in the example 4. The content S of the hexagonal pyramid-shaped Fe crystals is equal to 93.4%, as shown in Table 4.

The measurement of the Ni content was carried out by a procedure which comprises peeling each of the examples 1 to 16 from the piston body 2 and then subjecting each example to a citric acid addition absorptiometric analysis (JIS G1216).

Then, the examples 1 to 16 were subjected to a corrosion test. This corrosion test was carried out according to JIS H8502 "a plating corrosion resistance test process, (1) a neutral saline water spray test process" and JIS Z2371 "a saline water spray test process". Conditions for the corrosion test were as follows: a concentration of sodium chloride of 40 g/liter; pH of 6.5; a spray amount of 1.5±0.5 ml/80 cm²/hr; air-saturated vessel temperature of 47°±2° C.; a saline water tank temperature of 35°±2° C.; a test cell temperature of 35°±2° C.; a compressed air pressure of 69 to 167 kPa; and a test time of 16 hours. After the corrosion test, the slide surface of each of the examples 1 to 16 was cleaned by dilute hydrochloric acid to remove any corrosion product.

Figure 9B:
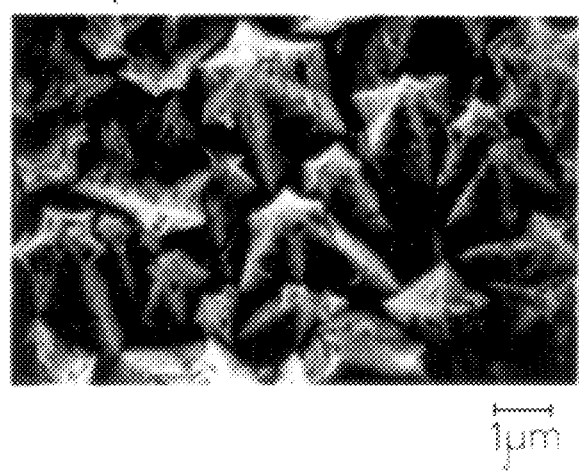
FIG. 9B is a photomicrograph showing the crystal structure of the first of the slide surface after the corrosion test.

FIG. 9B is a photomicrograph showing the crystal structure of the slide surface in the example 4 after the corrosion test. In FIG. 9B, it is observed that the large number of hexagonal pyramid-shaped Fe crystals were left in states that are only a little different from the original states before the corrosion test shown in FIG. 9A. This is attributable to the Ni content in the example 4 being equal to 8% by weight.

Figure 10B:
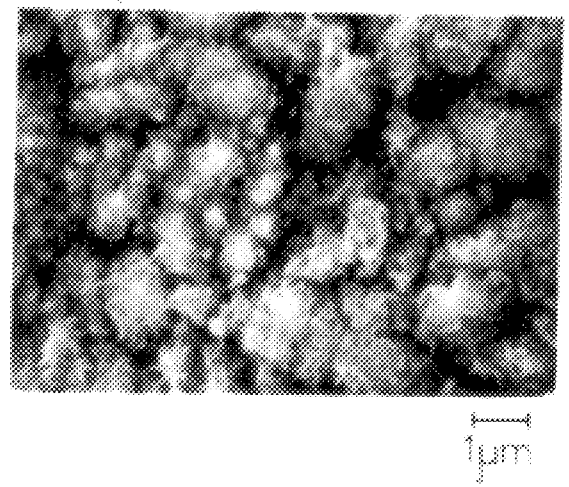
FIG. 10B is a photomicrograph showing the crystal structure of the second example of the slide surface after the corrosion test.

FIG. 10B is a photomicrograph showing the crystal structure of the slide surface in the example 1 after the corrosion test. In FIG. 10B, it is observed that the hexagonal pyramid-shaped Fe crystals shown in FIG. 10A were corroded and granulated. This granulation is attributable to the Ni content in the example 1 being zero.

Then, chips from the examples 1 to 16 after the corrosion test were fabricated and subjected to a seizure test in a chip-on-desk manner under lubrication to measure a seizure generating load, thereby providing the results given in Table 8. Conditions for the seizure test were as follows: the material for the disk was an Al—Si (10% by weight) aluminum alloy; the peripheral speed of the disk was 15 m/sec; the amount of oil supplied was 0.3 ml/min; and the area of the slide surface of the chip was 1 cm².

TABLE 8

| Slide surface construction | Seizure generating load (N) | Slide surface construction | Seizure generating load (N) |
|---|---|---|---|
| Example 1 | 600 | Example 9 | 400 |
| Example 2 | 800 | Example 10 | 600 |
| Example 3 | 1400 | Example 11 | 1100 |
| Example 4 | 1500 | Example 12 | 1180 |
| Example 5 | 500 | Example 13 | 200 |
| Example 6 | 700 | Example 14 | 350 |
| Example 7 | 1300 | Example 15 | 500 |
| Example 8 | 1420 | Example 16 | 580 |

Figure 11:
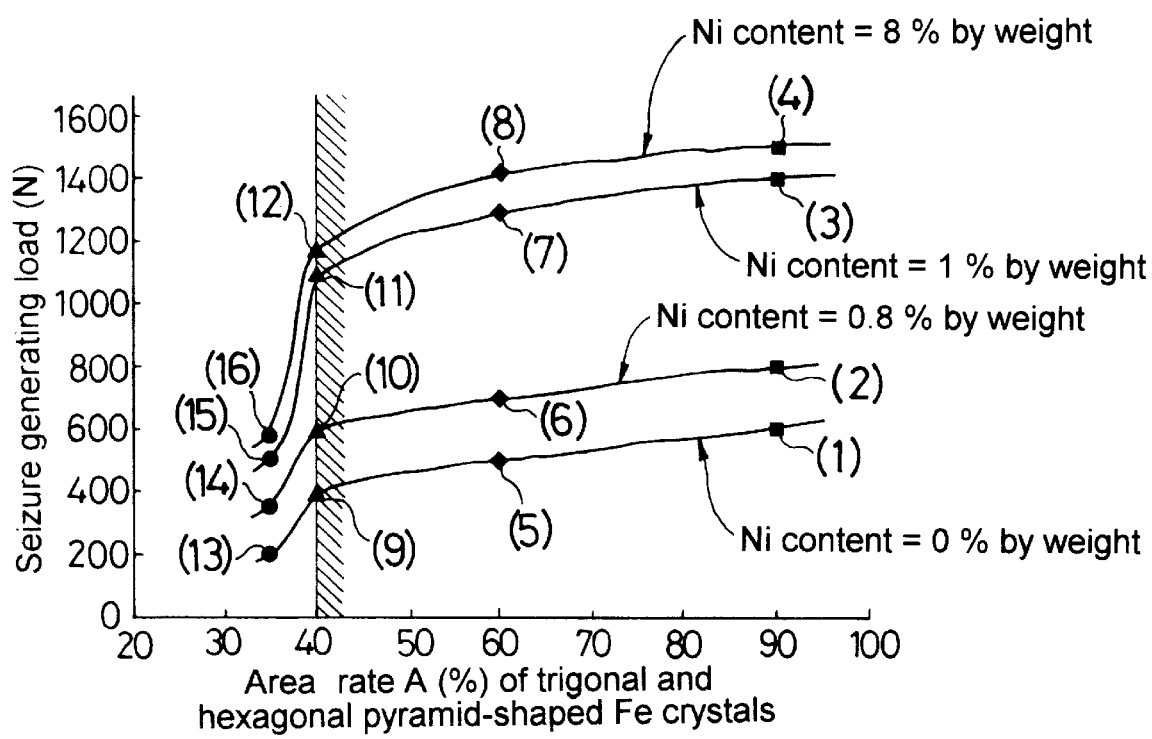
FIG. 11 is a graph showing the relationship between the area rate A of trigonal and hexagonal pyramid-shaped Fe crystals and the seizure generating load for the first, second and other examples of a slide surface.

FIG. 11 is a graph illustrating the relationship between the area rate A of the trigonal and/or hexagonal pyramid-shaped Fe crystals and the seizure generating load by the Ni content for the examples 1 to 16. In FIG. 11, points (1) to (16) correspond to the examples 1 to 16, respectively.

It can be seen from FIG. 11 that the examples 3, 4, 7, 8, 11 and 12 are remarkably high in seizure generating load, as compared with the other examples 1, 2, 5, 6, 9, 10 and 13 to 16. This is due to the following reason: the examples 3, 4, 7, 8, 11 and 12 exhibit an excellent corrosion resistance, because the Ni content is set in a range of Ni≧1% by weight in these examples. Consequently, even after the corrosion test, the area rate A≧40% is maintained, namely, the good oil retention is maintained. In the example 1, the seizure resistance is extremely reduced with the granulation, as compared with the example 4.

The first embodiment of this invention is not limited to the piston as the slide member but rather is also applicable to various slide members such as a piston pin, a cam shaft, a piston ring and the like.

(Second Embodiment)

Figure 12:
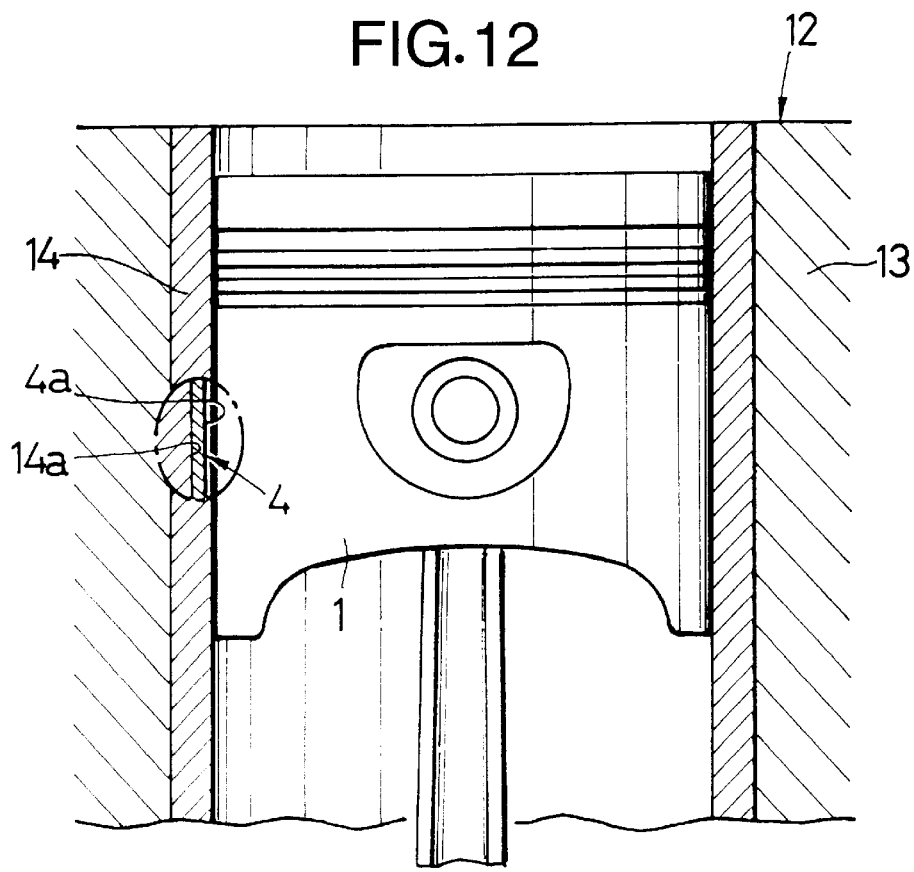
FIG. 12 is a vertical sectional view of an essential portion of a cylinder block including a piston with a portion enlarged.

Referring to FIG. 12, a cylinder block 12 for a diesel engine includes a cylinder block body 13 made of an aluminum alloy and a cylinder sleeve 14 made of a cast iron. A lamellar slide surface construction 4 is formed by plating on an inner peripheral surface 14a of the cylinder sleeve 14. A piston 1 made of an aluminum alloy is slidably mounted within the cylinder sleeve 14.

As in the first embodiment, the slide surface construction 4 is formed of an aggregate of Fe crystals having a body-centered cubic structure (which will be referred to as a bcc structure), as shown in FIG. 2. The aggregate contains Cr which is an added element. The content of Cr in the aggregate preferably is set in a range of 2% by weight≦Cr≦48% by weight. The aggregate includes at least one of either a large number of (hhh) oriented Fe crystals 5 which are grown from the inner peripheral surface 14a of the cylinder sleeve 14 into a columnar shape with their (hhh) planes (by Miller indices) oriented toward a slide surface 4a, and a large number of (2hhh) oriented Fe crystals which are grown from the inner peripheral surface 14a of the cylinder sleeve 14 into a columnar shape with their (2hhh) planes (by Miller indices) oriented toward the slide surface 4a.

As in the first embodiment, when the aggregate of the Fe crystals 5 includes the large number of (hhh) oriented Fe crystals 5 with their (hhh) planes (by Miller indices) oriented toward the slide surface 4a, as described above, tip ends of the (hhh) oriented Fe crystals 5 can be formed into hexagonal pyramid-shaped Fe crystals 6 as shown in FIG. 4 or trigonal pyramid-shaped Fe crystals 7 as shown in FIG. 5 in the slide surface 4a. The characteristics of the hexagonal pyramid-shaped Fe crystals 6 have been described in the first embodiment and hence, the description thereof is omitted herein.

When the aggregate of the Fe crystals includes the large number of (2hhh) oriented Fe crystals with their (2hhh) planes (by Miller indices) oriented toward the slide surface 4a, tip ends of the (2hhh) oriented Fe crystals can be formed into small pyramid-shaped Fe crystals, as in the first embodiment.

The area rate A of the pyramid-shaped Fe crystals such as the hexagonal and trigonal pyramid-shaped Fe crystals 6 and 7 and the small pyramid-shaped Fe crystals preferably is set in a range of 40%≦A≦100%, as in the first embodiment.

If the area rate A is set in such a range, the hexagonal pyramid-shaped Fe crystals 6 are formed into a state with adjacent crystals biting into each other, as in the first embodiment. Thus, the surface area of the slide surface 4a is increased, as compared with the case where the slide surface 4a is formed of the trigonal pyramid-shaped Fe crystals 7, and the slide surface 4a takes on a very intricate aspect comprising a large number of extremely fine crests 8, a large number of extremely fine valleys 9 formed between the crests 8, and a large number of extremely fine swamps 10 formed due to mutual biting of the crests 8.

If the content of chromium (Cr) in the aggregate of the Fe crystals is set in the above-described range, Cr forms a substitutional solid solution together with Fe. In a corrosive sliding environment containing an acid, the slide surface 4 is passivated, for example, by formation of a stationary skin on the surface of each hexagonal pyramid-shaped Fe crystal 6 and hence, the slide surface construction 4 exhibits an excellent corrosion resistance.

In such a slide surface construction 4, even if it is placed in a corrosive sliding environment containing sulfuric acid, the corrosion of each hexagonal pyramid-shaped Fe crystal 6 is inhibited. Therefore, under lubrication, the oil retention of the slide surface construction 4 is maintained satisfactorily, and under non-lubrication, the dispersion of a sliding load is provided by the large number of extremely fine hexagonal pyramid-shaped Fe crystals. Thus, the slide surface construction 4 exhibits an excellent seizure resistance under both lubrication and non-lubrication.

Further, as a result of uniform fine division of the hexagonal pyramid-shaped Fe crystals 6, a local increase in surface pressure can be avoided and a fine division of the sliding load can be achieved. Thus, the slide surface construction 4 exhibits an excellent wear resistance not only under lubrication but also under non-lubrication.

For the same reason as in the first embodiment, the inclination angle θ formed by the (hhh) plane and the (2hhh) plane with respect to a phantom plane 11 is set in a range of 0°≦θ≦15°, as shown in FIG. 6.

In a plating treatment for forming the slide surface construction 4, conditions for a plating bath in carrying out an electrolytic Fe plating process are as given in Table 9.

TABLE 9

| Composition (g/liter) | | | | | |
|---|---|---|---|---|---|
| Ferrous sulfate | Boric acid | Ammonium sulfate | Cr-containing additive | pH | Temperature (°C.) |
| 100–400 | 0–50 | 0–200 | ≦180 | 3–6.5 | 10–60 |

The Cr-containing additive used may be any of substances which contain chromium (Cr) and which are soluble in water, such as chromic acid anhydride, chromium sulfate, chrome alum (potassium chromium sulfate, ammonium chromium sulfate and the like), chromium chloride (III), chromium borofluoride and the like.

As in the first embodiment, a pulse current process is mainly utilized as an energizing process, as shown in FIG. 7. In the pulse current process, the time ratio $T_{ON}/T_C$, the maximum cathode current density CDmax and the average cathode current density CDm are the same as in the first embodiment, i.e., $T_{ON}/T_C \leq 0.45$; CDmax≧2 A/dm$^2$; and CDm≧1 A/dm$^2$.

The effect provided by such pulse current process has been described in the first embodiment, and hence, the description thereof is omitted herein. The precipitation, content and the like of the (hhh) oriented Fe crystals or the (2hhh) oriented Fe crystals in the electrolytic Fe plating process are controlled in the same manner as in the first embodiment.

Further, for the slide surface construction 4, a liquid replenisher adjusted to the same composition and the same temperature as the plating bath is supplied in a predetermined amount between the anode and the cathode during the electrolytic Fe plating process in order to accurately control the Cr content and uniformly disperse Cr. If this supplying is not carried out, a variability in concentration of the Cr-containing additive in the plating bath is produced and for this reason, it is difficult to control the content of Cr in the slide surface construction 4.

Usually, the content of Cr in the slide surface construction 4 is controlled by the concentration of the Cr-containing additive in the plating bath. However, if the other plating bath conditions including such concentration are constant, the content of Cr in the slide surface construction is controlled by the maximum cathode current density CDmax and the average cathode current density CDm.

If Cr is contained in the aggregate of the Fe crystals, the acid resistance of the slide surface construction 4 can be enhanced. If nickel (Ni) is further contained in the aggregate in a content of Ni≧1% by weight, the acid resistance can be further enhanced. This is because the passivation of the slide surface 4a is promoted by the addition of Ni.

The upper limit value for the Ni content is determined depending upon the Cr content. Specifically, it is preferred that if Cr<10% by weight, then Ni=40% by weight; if 10% by weight≦Cr<20% by weight, then Ni=30% by weight; if 20% by weight≦Cr<30% by weight, then Ni=20% by weight; and further, if 30% by weight≦Cr≦48% by weight, then Ni=10% by weight. In each of these cases, if the Ni content exceeds the upper limit value, the amount of Ni-based intermetallic compound produced is increased. For this reason, the Fe crystals are liable to be granulated in the slide surface 4a, and the strength of the slide surface construction 4 is reduced due to a grain boundary segregation of such intermetallic compound.

The Ni-containing additive used in the plating bath may be any substance which contains Ni and which is soluble in water, such as nickel sulfate, nickel chloride, nickel sulfaminate, nickel sulfosalicylate, nickel acetate and the like. The amount of such substance added is 30 g/liter or less.

For the same reason as in the case of Cr, i.e., in order to accurately control the content of Ni in the slide surface construction 4 and uniformly disperse Ni, a liquid replenisher adjusted to the same composition and the same temperature as in the plating bath is supplied in a predetermined amount between the anode and cathode during the electrolytic Fe plating. Usually, the content of Ni in the slide surface construction 4 is controlled by the concentration of the Ni-containing additive in the plating bath.

In addition to the electrolytic Fe plating, examples of other plating processes are a PVD process, a CVD process, a sputtering process, an ion plating and the like, which are gasphase plating processes, as in the first embodiment.

(1) Slide surface construction containing Cr

Slide surface constructions 4 each comprised of an aggregate of Fe crystals and having a thickness of 15 μm were each formed by subjecting an inner peripheral surface 14a of a cylinder sleeve 14 made of a cast iron (JIS FC250) to an electrolytic Fe plating process.

Table 10 shows the composition of the plating bath for examples 1 to 16 of the slide surface constructions, and Table 11 shows the pH and the temperature of the plating bath, and the conditions for carrying out a pulse current process for the examples 1 to 16. The plating time was varied within 5 to 60 minutes in order to set the thickness for the examples 1 to 16 at 15 μm as described above. The amount of liquid replenisher supplied was set at 0.5 liters/min.

TABLE 10

| | Composition of plating bath | |
|---|---|---|
| Slide surface construction | Ferrous sulfate (g/liter) | Nickel sulfate (g/liter) |
| Example 1 | 400 | 0 |
| Example 2 | 400 | 50 |
| Example 3 | 400 | 50 |
| Example 4 | 400 | 100 |
| Example 5 | 300 | 0 |
| Example 6 | 300 | 50 |
| Example 7 | 300 | 50 |
| Example 8 | 300 | 100 |
| Example 9 | 200 | 0 |
| Example 10 | 200 | 50 |
| Example 11 | 200 | 50 |
| Example 12 | 200 | 100 |
| Example 13 | 100 | 0 |
| Example 14 | 100 | 50 |
| Example 15 | 100 | 50 |
| Example 16 | 100 | 100 |

TABLE 11

| | Plating Bath | | Pulse current process | | | |
|---|---|---|---|---|---|---|
| Slide Surface construction | pH | Temperature (°C.) | CDmax (A/dm$^2$) | CDm (A/dm$^2$) | $T_{ON}/T_C$ | $T_{ON}$ (msec) |
| Examples 1, 2, 4, 5, 6, 8, 9, 10, 12, 13, 14 and 16 | 6 | 50 | 20 | 4 | 0.2 | 2 |
| Examples 3, 7, 11 and 15 | 6 | 50 | 25 | 5 | 0.2 | 2 |

Tables 12, 13, 14 and 15 show the crystal form of the slide surface, the area rate A and grain size of the trigonal and/or hexagonal pyramid-shaped Fe crystals in the slide surface, the content S of the oriented Fe crystals, the Cr content and the hardness of the slide surface construction section, wherein Table 12 corresponds to those for the examples 1 to 4; Table 13 corresponds to those for the examples 5 to 8; Table 14 corresponds to those for the examples 9 to 12; and Table 15 corresponds to those for the examples 13 to 16.

TABLE 12

| Slide surface construction | Crystalline form of slide surface | Hexagonal pyramid-shaped Fe crystals | | Content S (%) of oriented Fe crystals | | | | | Cr content (% by weight) | Hardness (HmV) |
|---|---|---|---|---|---|---|---|---|---|---|
| | | Area rate A (%) | Grain size μm | {110} | {200} | {211} | {310} | {222} | | |
| Example 1 | Hexagonal pyramid-shaped and granular | 90 | 1 to 3 | 0.9 | 0.2 | 3.3 | 2.2 | 93.4 | 0 | 210 |
| Example 2 | Hexagonal pyramid-shaped and | 90 | 0.5 to 3 | 1 | 0 | 5.6 | 0 | 93.4 | 1.5 | 250 |

TABLE 12-continued

| Slide surface construction | Crystalline form of slide surface | Hexagonal pyramid-shaped Fe crystals | | Content S (%) of oriented Fe crystals | | | | | Cr content (% by weight) | Hardness (HmV) |
|---|---|---|---|---|---|---|---|---|---|---|
| | | Area rate A (%) | Grain size μm | {110} | {200} | {211} | {310} | {222} | | |
| Example 3 | Hexagonal pyramid-shaped and granular | 90 | 0.5 to 2 | 0.7 | 0 | 7.7 | 0 | 91.6 | 2 | 500 |
| Example 4 | Hexagonal pyramid-shaped and granular | 90 | 1 to 3 | 0.4 | 0 | 8.1 | 0 | 91.5 | 10 | 550 |

TABLE 13

| Slide surface construction | Crystalline form of slide surface | Trigonal, hexagonal pyramid-shaped Fe crystals | | Content S (%) of oriented Fe crystals | | | | | Cr content (% by weight) | Hardness (HmV) |
|---|---|---|---|---|---|---|---|---|---|---|
| | | Area rate A (%) | Grain size μm | {110} | {200} | {211} | {310} | {222} | | |
| Example 5 | Hexagonal and trigonal pyramid-shaped and granular | 60 | 1 to 5 | 10.7 | 8.5 | 11.9 | 8.5 | 60.4 | 0 | 200 |
| Example 6 | Hexagonal and trigonal pyramid-shaped and granular | 60 | 0.5 to 4 | 12.3 | 0.3 | 25.1 | 0.8 | 61.5 | 1.5 | 240 |
| Example 7 | Hexagonal and trigonal pyramid-shaped and granular | 60 | 0.5 to 3 | 11.9 | 0.5 | 26 | 0.7 | 60.9 | 2 | 480 |
| Example 8 | Hexagonal and trigonal pyramid-shaped and granular | 60 | 0.5 to 2 | 11.8 | 0.9 | 24 | 1.2 | 62.1 | 10 | 540 |

TABLE 14

| Slide surface construction | Crystalline form of slide surface | Trigonal pyramid-shaped Fe crystals | | Content S (%) of oriented Fe crystals | | | | | Cr content (% by weight) | Hardness (HmV) |
|---|---|---|---|---|---|---|---|---|---|---|
| | | Area rate A (%) | Grain size μm | {110} | {200} | {211} | {310} | {222} | | |
| Example 9 | Trigonal pyramid-shaped and granular | 40 | 0.5 to 5 | 16.7 | 14 | 16.9 | 10.1 | 42.3 | 0 | 190 |
| Example 10 | Trigonal pyramid-shaped and granular | 40 | 0.5 to 5 | 21.1 | 10.7 | 26.4 | 1.1 | 40.7 | 1.5 | 200 |
| Example 11 | Trigonal pyramid-shaped and granular | 40 | 0.5 to 3 | 20.8 | 11.4 | 25.9 | 1.4 | 40.5 | 2 | 470 |
| Example 12 | Trigonal pyramid-shaped and granular | 40 | 0.5 to 2 | 20.3 | 10.9 | 26.5 | 1.7 | 40.6 | 10 | 560 |

TABLE 15

| Slide surface construction | Crystalline form of slide surface | Hexagonal pyramid-shaped Fe crystals Area rate A (%) | Grain size μm | Content S (%) of oriented Fe crystals {110} | {200} | {211} | {310} | {222} | Cr content (% by weight) | Hardness (HmV) |
|---|---|---|---|---|---|---|---|---|---|---|
| Example 13 | Trigonal pyramid-shaped and granular | 35 | 0.5 to 6 | 19.5 | 10.1 | 21.5 | 13.7 | 34.6 | 0 | 180 |
| Example 14 | Trigonal pyramid-shaped and granular | 35 | 0.5 to 6 | 21.5 | 11.8 | 21 | 10.9 | 34.8 | 1.5 | 190 |
| Example 15 | Trigonal pyramid-shaped and granular | 35 | 0.5 to 6 | 22.2 | 12 | 20 | 11.5 | 34.3 | 2 | 280 |
| Example 16 | Trigonal pyramid-shaped and granular | 35 | 0.5 to 6 | 20.9 | 12.4 | 20.6 | 11.1 | 35 | 10 | 350 |

The area rate A of the trigonal and/or hexagonal pyramid-shaped Fe crystals was determined in the same manner as in the first embodiment. The definition of the grain size (i.e., grain diameter) of the hexagonal and trigonal pyramid-shaped Fe crystals is as described in the first embodiment.

Figure 13:
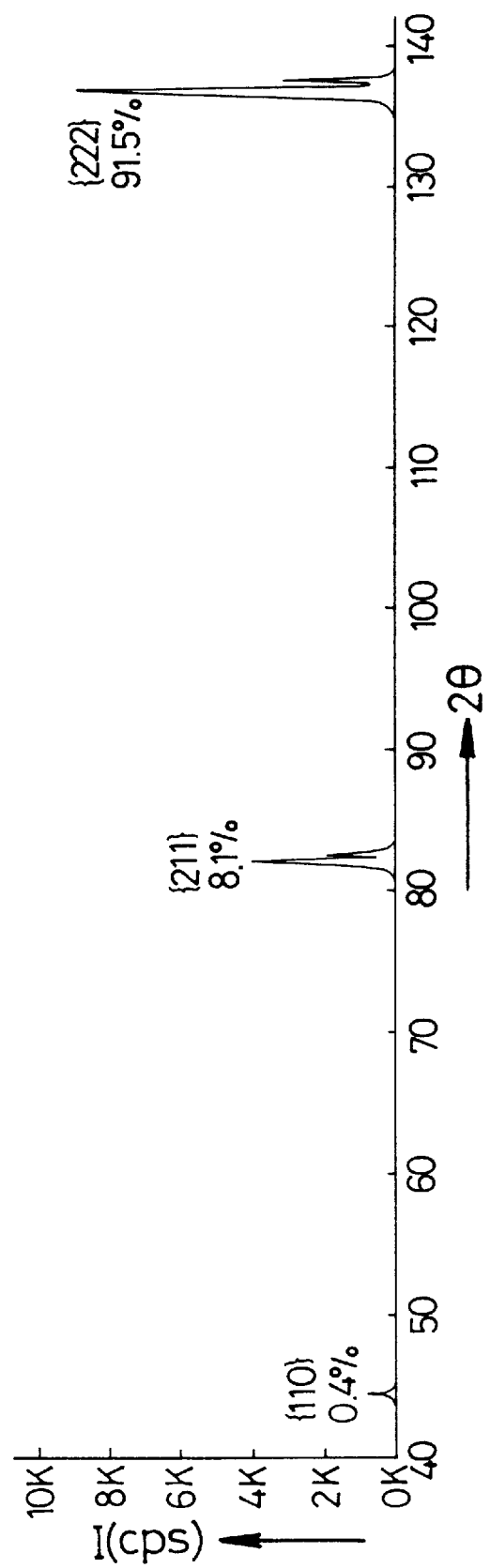
FIG. 13 is an X-ray diffraction pattern for a slide surface construction.

The content S of the oriented Fe crystals was determined in the same manner as in the first embodiment, based on the X-ray diffraction patterns (the X-ray beam was applied in a direction perpendicular to the slide surface) for the examples 1 to 16. FIG. 13 shows the X-ray diffraction pattern for the example 4.

Figure 14A:
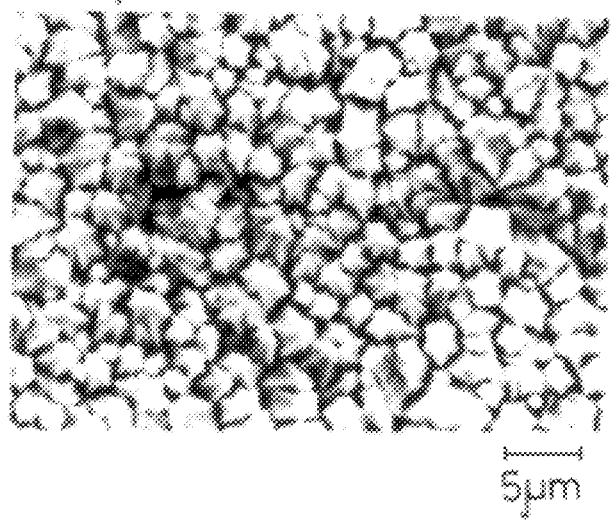
FIG. 14A is a photomicrograph showing the crystal structure of a third example of a slide surface before a corrosion test.

FIG. 14A is a photomicrograph showing the crystal structure of the slide surface in the example 4. In FIG. 14A, a large number of hexagonal pyramid-shaped Fe crystals are observed. In this case, the area rate A of the hexagonal pyramid-shaped Fe crystals is equal to 90%, as given in Table 12. The hexagonal pyramid-shaped Fe crystals are {222} oriented Fe crystals, as in the first embodiment. The content S of the {222} oriented Fe crystals is equal to 91.5%, as shown in Table 12 and FIG. 13.

Figure 15A:
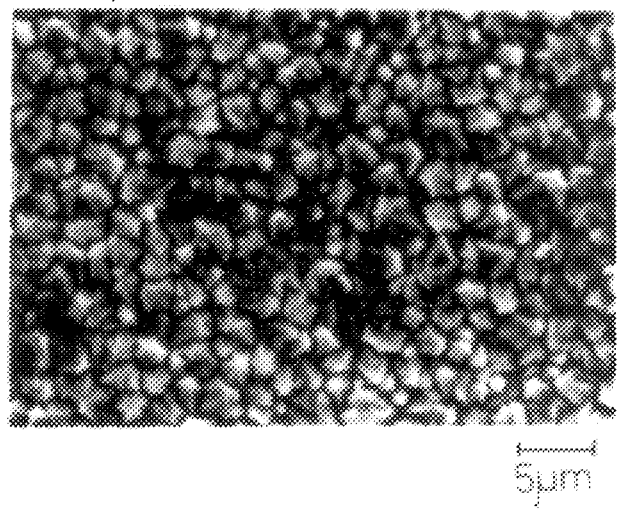
FIG. 15A is a photomicrograph showing the crystal structure of a fourth example of a slide surface before the corrosion test.

FIG. 15A is a photomicrograph showing the crystal structure of the slide surface in the example 1. In this case, the area rate A of the hexagonal pyramid-shaped Fe crystals is equal to 90%, as shown in Table 12. The hexagonal pyramid-shaped Fe crystals are likewise {222} oriented Fe crystals. The content S of the hexagonal pyramid-shaped Fe crystals is equal to 93.4%, as shown in Table 12.

The measurement of the Cr content was carried out by a procedure which comprises peeling each of the examples 2 to 4, 6 to 8, 10 to 12 and 14 to 16 (excluding the examples 1, 5, 9 and 13) from the cylinder sleeve 14 and then subjecting each example to an analysis according to a perchloric acid oxidation potassium permanganate titration process (JIS G1217).

Then, each of the examples 1 to 16 was subjected to a corrosion (oxidation) test which will be described below. Each of the examples 1 to 16 was immersed in a boiling 5% sulfuric acid for 2 hours and then immersed in a 30% nitric acid to remove any corrosion product from each example. Thereafter, each of the examples 1 to 16 was immediately washed by running water and dried.

Figure 14B:
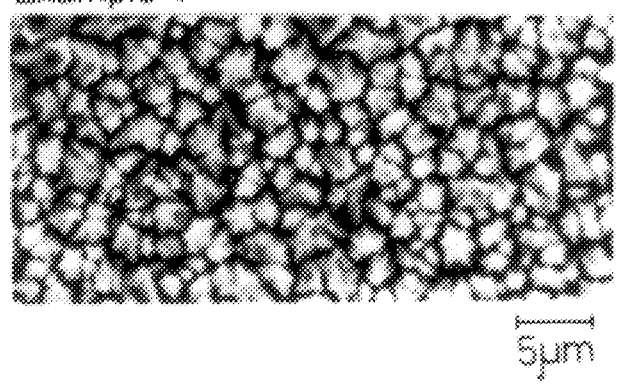
FIG. 14B is a photomicrograph showing the crystal structure of the third example of the slide surface after the corrosion test.

FIG. 14B is a photomicrograph showing the crystal structure of the slide surface in the example 4 after the corrosion test. In FIG. 14B, it is observed that the hexagonal pyramid-shaped Fe crystals were left in states that are only little changed from the states before the corrosion test in FIG. 14A. This is attributable to the Cr content in the example 4 being equal to 10% by weight.

Figure 15B:
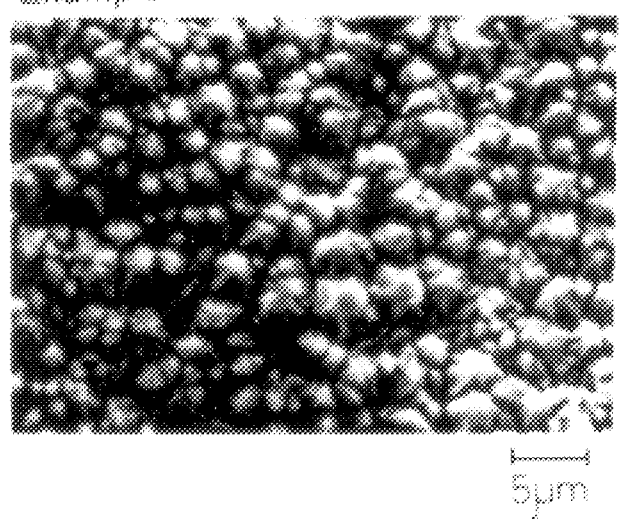
FIG. 15B is a photomicrograph showing the crystal structure of the fourth example of the slide surface after the corrosion test.

FIG. 15B is a photomicrograph showing the crystal structure of the slide surface in the example 1 after the corrosion test. In FIG. 15B, it is observed that the hexagonal pyramid-shaped Fe crystals shown in FIG. 15A were corroded granulated. This granulation is due to the Cr content in the example 1 being zero.

Then, chips having the examples 1 to 16 after the corrosion test were fabricated and subjected to a seizure test in a chip-on-disk manner under lubrication to measure a seizure generating load, thereby providing the results given in Table 16. Conditions for the seizure test were as follows: the material for the disk was an Al—Si (10% by weight) alloy; the peripheral speed of the disk was 15 m/sec; the amount of oil supplied was 0.3 ml/min; and the area of the slide surface of the chip was 1 cm$^2$.

TABLE 16

| Slide surface construction | Seizure generating load (N) | Slide surface construction | Seizure generating load (N) |
|---|---|---|---|
| Example 1 | 600 | Example 9 | 400 |
| Example 2 | 700 | Example 10 | 470 |
| Example 3 | 1630 | Example 11 | 1200 |
| Example 4 | 2100 | Example 12 | 1550 |
| Example 5 | 500 | Example 13 | 200 |
| Example 6 | 580 | Example 14 | 250 |
| Example 7 | 1380 | Example 15 | 400 |
| Example 8 | 1830 | Example 16 | 600 |

Figure 16:
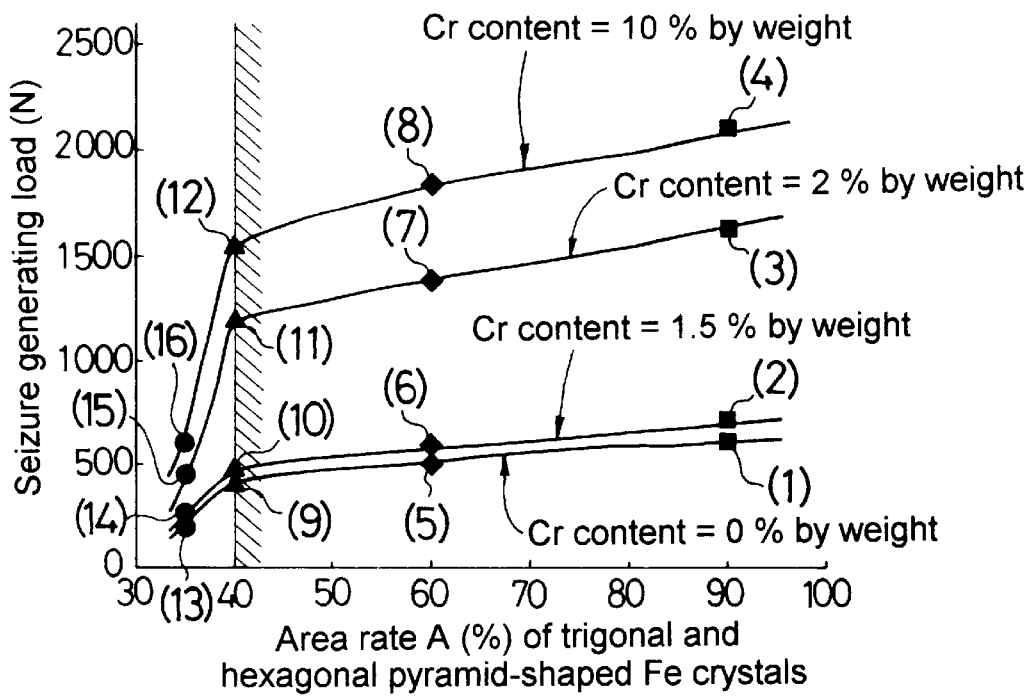
FIG. 16 is a graph showing the relationship between the area rate A of trigonal and hexagonal pyramid-shaped Fe crystals and the seizure generating load of the third, fourth and other examples of the slide member.

FIG. 16 is a graph illustrating the relationship between the area rate A of the trigonal and/or hexagonal pyramid-shaped Fe crystals and the seizure generating load by the Cr content for the examples 1 to 16. In FIG. 16, points (1) to (16) correspond to the examples 1 to 16, respectively.

It can be seen from FIG. 16 that the examples 3, 4, 7, 8, 11 and 12 are remarkably high in seizure generating load, as compared with the other examples 1, 2, 5, 6, 9, 10 and 13 to 16. This is due to the following reason: the examples 3, 4, 7, 8, 11 and 12 exhibit an excellent corrosion resistance, because the Cr content is set in a range of $Cr \geq 2\%$ by weight in these examples. Consequently, even after the corrosion test, the area rate $A \geq 40\%$ is maintained, namely, the good oil retention is maintained. In the example 1, the seizure resistance is extremely reduced by the granulation, as compared with the example 4.

Then, to stimulate a cylinder sleeve 14, examples 1 to 16 were formed on an outer periphery of one surface of a disk made of a cast iron (JIS FC250) in the same manner as that described above and were subjected to a wear test in a chip-on-disk manner in sulfuric acid having a concentration of 35% by weight to measure a corrosion wear rate, thereby providing results given in Table 17. Conditions for the wear test were as follows: the material for the chip was an Al—Si (10% by weight) alloy; the peripheral speed of the disk was 0.15 m/sec; a pressing force on the chip was 2 MPa (constant); the area of the slide surface of the chip was 1 cm$^2$; the slide distance was 200 to 500 m; the wear rate was the amount of disk weight decreased (mg)/the slide distance (m).

TABLE 17

| Slide surface construction | Corrosion wear rate (mg/m) | Slide surface construction | Corrosion wear rate (mg/m) |
| --- | --- | --- | --- |
| Example 1 | 0.32 | Example 9 | 0.38 |
| Example 2 | 0.28 | Example 10 | 0.35 |
| Example 3 | 0.19 | Example 11 | 0.24 |
| Example 4 | 0.15 | Example 12 | 0.19 |
| Example 5 | 0.34 | Example 13 | 0.47 |
| Example 6 | 0.3 | Example 14 | 0.42 |
| Example 7 | 0.2 | Example 15 | 0.39 |
| Example 8 | 0.16 | Example 16 | 0.36 |

Figure 17:
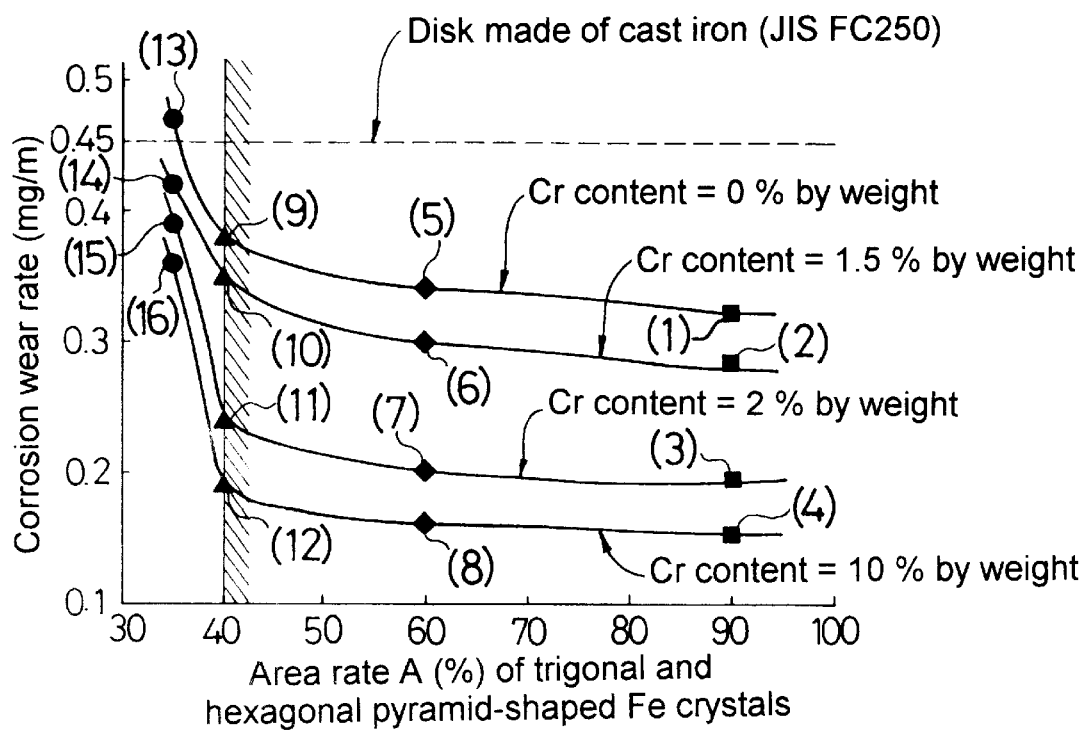
FIG. 17 is a graph showing the relationship between the area rate A of trigonal and hexagonal pyramid-shaped Fe crystals and the corrosion wear rate of the examples shown in FIG. 16.

FIG. 17 is a graph illustrating the relationship between the area rate A of the trigonal and/or hexagonal pyramid-shaped Fe crystals and the corrosion wear rate by the Cr content for the examples 1 to 16. In FIG. 17, points (1) to (16) correspond to the examples 1 to 16, respectively.

It can be seen from FIG. 17 that in the examples 3, 4, 7, 8, 11 and 12, the corrosion wear rate is inhibited to a large extent, as compared with the other examples 1, 2, 5, 6, 9, 10 and 13 to 16. This is due to the following reason: the examples 3, 4, 7, 8, 11 and 12 exhibit an excellent acid resistance, because the Cr content is set in a range of $Cr \geq 2\%$ by weight in these examples. Consequently, even during the corrosion test, the area rate $A \geq 40\%$ is maintained and hence, a local increase in surface pressure is avoided, and a fine division of the slide load is achieved. The corrosion wear rate of the disk made of the cast iron (JIS FC250) which does not have a slide surface construction of any of the examples 1 to 16 was 0.45 mg/m.

(2) Slide construction containing Cr and Ni

Slide surface constructions each comprised of an aggregate of Fe crystals and having a thickness of 15 μm were formed by subjecting an inner peripheral surface 14a of the cylinder sleeve 14 made of a cast iron (JIS FC250) to an electrolytic Fe plating process.

Table 18 shows the composition of the plating bath for examples 1 to 3 of the slide surface constructions, and Table 19 shows the pH and the temperature of the plating bath for the examples 1 to 3, and the conditions for carrying out a pulse current process. The plating time was varied within 5 to 60 minutes in order to set the thickness for the examples 1 to 3 at 15 μm as described above. The amount of liquid replenisher supplied was set at 0.5 liters/min.

TABLE 18

| | Composition of plating bath | | |
| --- | --- | --- | --- |
| Slide surface construction | ferrous sulfate (g/liter) | Chromium sulfate (g/liter) | Nickel sulfate (g/liter) |
| Example 1 | 400 | 50 | 0 |
| Example 2 | 400 | 50 | 50 |
| Example 3 | 400 | 50 | 100 |

TABLE 19

| | Plating Bath | | Pulse current process | | | |
| --- | --- | --- | --- | --- | --- | --- |
| Slide surface construction | pH | Temperature (°C.) | CDmax (A/dm$^2$) | CDm (A/dm$^2$) | $T_{ON}/T_C$ | $T_{ON}$ (msec) |
| Examples 1 to 3 | 6 | 50 | 25 | 5 | 0.2 | 2 |

Table 20 shows the content S of the oriented Fe crystals for the examples 1 to 3, and Table 21 shows the crystal form of the examples 1 to 3, the area rate A of the hexagonal pyramid-shaped Fe crystals in the slide surface, the Cr and Ni contents, and the hardness of the slide surface construction section.

TABLE 20

| Slice surface construction | Content S (%) of oriented Fe crystals | | | | |
| --- | --- | --- | --- | --- | --- |
| | {110} | {200} | {211} | {310} | {222} |
| Example 1 | 0.7 | 0 | 7.7 | 0 | 91.6 |
| Example 2 | 0.2 | 0 | 7.3 | 0.2 | 92.3 |
| Example 3 | 0.3 | 0.2 | 7.5 | 0 | 92 |

TABLE 21

| | | Hexagonal pyramid-shaped Fe Crystals | | | | |
| --- | --- | --- | --- | --- | --- | --- |
| Slide surface construction | Crystalline form of slide surface | Area rate A (%) | Grain size (μm) | Cr content (% by weight) | Ni content (% by weight) | Hardness HmV |
| Example 1 | hexagonal pyramid-shaped and granular | 90 | 0.5 to 2 | 2 | 0 | 500 |

TABLE 21-continued

| Slide surface construction | Crystalline form of slide surface | Hexagonal pyramid-shaped Fe Crystals | | | | |
|---|---|---|---|---|---|---|
| | | Area rate A (%) | Grain size (μm) | Cr content (% by weight) | Ni content (% by weight) | Hardness HmV |
| Example 2 | hexagonal pyramid-shaped and granular | 90 | 0.5 to 2 | 2 | 0.8 | 510 |
| Example 3 | hexagonal pyramid-shaped and granular | 90 | 0.5 to 2 | 2 | 1 | 520 |

The content S of the oriented Fe crystals, the area rate A and grain size of the hexagonal pyramid-shaped Fe crystals and the Cr content were determined in the same manner as in the above-described examples. The measurement of the Ni content was carried out by a procedure which comprises peeling each of the examples 2 and 3 (excluding the example 1) from the cylinder sleeve 14 and then subjecting each example to an analysis according to a citric acid addition absorptiometric analysis (JIS G1216).

Then, each of the examples 1 to 3 was subjected to a corrosion (oxidation) test which will be described below. Each of the examples 1 to 3 was immersed in a boiling 5% sulfuric acid for 2 hours and then immersed in a 30% nitric acid to remove any corrosion product from each example. Thereafter, each of the examples 1 to 3 was immediately washed by running water and dried.

Then, chips of the examples 1 to 3 after the corrosion test were fabricated and subjected to a seizure test in a chip-on-disk manner under lubrication to measure a seizure generating load, thereby providing results given in Table 22. Conditions for the seizure test were the same as those described above.

TABLE 22

| Slide surface construction | Seizure generating load (N) |
|---|---|
| Example 1 | 1630 |
| Example 2 | 1650 |
| Example 3 | 1810 |

Figure 18:
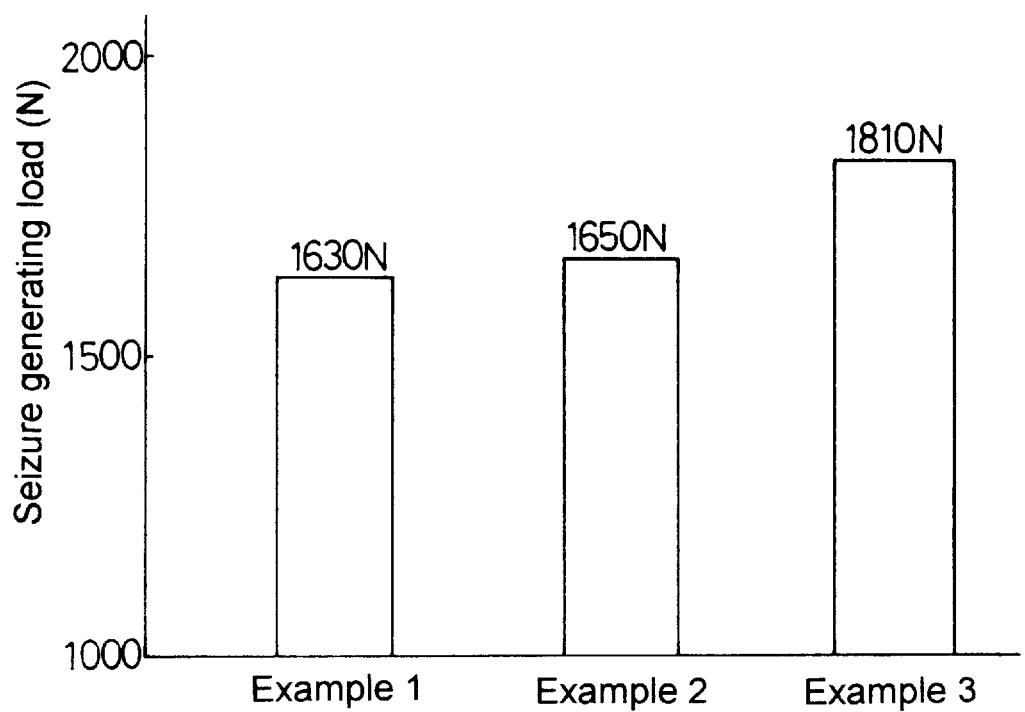
FIG. 18 is a graph showing the seizure generating load for still other examples.

FIG. 18 is a graph illustrating the seizure generating load for the examples 1 to 3. It can be seen from FIG. 18 and Tables 21 and 22 that if Cr is contained in the slide surface construction at a Cr content of 2% by weight, as in the examples 1, 2 and 3, the seizure generating load is enhanced. In this case, if the Ni content is set at 1% by weight or more, as in the example 3, the seizure resistance is remarkably increased.

The second embodiment is not limited to a slide surface construction of the cylinder sleeve but rather is also applicable to various slide members requiring an acid resistance, such as a piston, a piston ring and the like.

What is claimed is:

1. A slide surface construction, which is formed of an aggregate of Fe crystals containing Ni as an allowing element, wherein the area rate A of pyramid-shaped Fe crystals in the slide surface is in a range of 40%≦A≦100%, and the content of Ni in said aggregate is in a range of at least 1% by weight to at most 40% by weight.

2. A slide surface construction according to claim 1, wherein each of said pyramid-shaped Fe crystals is either an (hhh) oriented Fe crystal with its (hhh) planes by Miller indices oriented toward said slide surface or a (2hhh) oriented Fe crystal with its (2hhh) planes by Miller indices oriented toward said slide surface.

3. A slide surface construction according to claim 1 or 2, wherein each of said pyramid-shaped Fe crystals is a hexagonal pyramid-shaped (hhh) oriented Fe crystal with its (hhh) planes by Miller indices oriented toward said slide surface.

4. A slide surface construction, which is formed of an aggregate of Fe crystals containing Cr as an alloying element, wherein the area rate A of pyramid-shaped Fe crystals in the slide surface is in a range of 40%≦A≦100%, and the content of Cr in said aggregate is in a range of at least 2% by weight to at most 48% by weight.

5. A slide surface construction according to claim 4, wherein each of said pyramid-shaped Fe crystals is either an (hhh) oriented Fe crystal with its (hhh) planes by Miller indices oriented toward said slide surface or a (2hhh) oriented Fe crystal with its (2hhh) planes by Miller indices oriented toward said slide surface.

6. A slide surface construction according to claim 4 or 5, wherein each of said pyramid-shaped Fe crystals is a hexagonal pyramid-shaped (hhh) oriented Fe crystal with its (hhh) planes by Miller indices oriented toward said slide surface.

7. A slide surface construction according to claim 4 or 5, wherein said aggregate also contains nickel (Ni), the Ni content being less than or equal to 40% by weight and at least 1% by weight.

8. A slide surface construction according to claim 7, wherein the Cr content is less than 10% by weight.

9. A slide surface construction according to claim 7, wherein the Cr content is greater than 10% and less than 20% by weight, and the Ni content is less than or equal to 30% by weight.

10. A slide surface construction according to claim 7, wherein the Cr content is greater than 20% and less than 30% by weight, and the Ni content is less than or equal to 20% by weight.

11. A slide surface construction according to claim 7, wherein the Cr content is greater than 30% and less than 48% by weight, and the Ni content is less than or equal to 10% by weight.

12. A slide surface construction according to claim 6, wherein said aggregate also contains nickel (Ni), the Ni content being less than or equal to 40% by weight and least 1% by weight.

13. A slide surface construction according to claim 12, wherein the Cr content is less than 10% by weight.

14. A slide surface construction according to claim 12, wherein the Cr content is greater than 10% and less than 20% by weight, and the Ni content is less than or equal to 30% by weight.

15. A slide surface construction according to claim 12, wherein the Cr content is greater than 20% and less than 30% by weight, and the Ni content is less than or equal to 20% by weight.

16. A slide surface construction according to claim 12, wherein the Cr content is greater than 30% and less than 48% by weight, and the Ni content is less than or equal to 10% by weight.

17. A slide surface construction, which is formed of an aggregate of Fe crystals containing at least one additional element from the group consisting of Ni and Cr, wherein the area rate A of pyramid-shaped Fe crystals in the slide surface is in a range of $40\% \leq A \leq 100\%$, the content of any Ni in said aggregate is in a range of at least 1% by weight to at most 40% by weight, and the content of any Cr in said aggregate is in a range of at least 2% by weight to at most 48% by weight.

18. A slide surface construction according to claim 17, wherein each of said pyramid-shaped Fe crystals is either an (hhh) oriented Fe crystal with its (hhh) planes by Miller indices oriented toward said slide surface or a (2hhh) oriented Fe crystal with its (2hhh) planes by Miller indices oriented toward said slide surface.

19. A slide surface construction according to claim 17 or 18, wherein each of said pyramid-shaped Fe crystals is a hexagonal pyramid-shaped (hhh) oriented Fe crystal with its (hhh) planes by Miller indices oriented toward said slide surface.

20. A slide surface construction according to claim 17, wherein said aggregate contains both Ni and Cr.

* * * * *